United States Patent
Wood

(10) Patent No.: US 6,911,790 B2
(45) Date of Patent: Jun. 28, 2005

(54) MULTIPLEXED HIGH VOLTAGE DC-AC DRIVER

(75) Inventor: Grady M. Wood, Satellite Beach, FL (US)

(73) Assignee: Intersil Americas Inc., Milpitals, CA (US)

(*) Notice: Subject to any disclaimer, the term of this patent is extended or adjusted under 35 U.S.C. 154(b) by 4 days.

(21) Appl. No.: 10/713,376

(22) Filed: Nov. 14, 2003

(65) Prior Publication Data

US 2005/0104540 A1 May 19, 2005

(51) Int. Cl.[7] .............................................. H05B 37/02
(52) U.S. Cl. ...................... 315/291; 315/194; 315/226; 315/307
(58) Field of Search .............................. 315/194, 209 R, 315/225–226, 291, 307, 299, 301; 363/123, 131

(56) References Cited

U.S. PATENT DOCUMENTS

| | | | | |
|---|---|---|---|---|
| 4,017,744 A | * | 4/1977 | Johnson | 327/172 |
| 4,296,462 A | * | 10/1981 | Gurr | 363/96 |
| 4,595,976 A | * | 6/1986 | Parro, II | 363/41 |
| 4,691,274 A | * | 9/1987 | Matouk et al. | 363/141 |
| 5,600,548 A | * | 2/1997 | Nguyen et al. | 363/41 |
| 5,798,620 A | * | 8/1998 | Wacyk et al. | 315/307 |
| 6,021,052 A | * | 2/2000 | Unger et al. | 363/26 |
| 6,031,738 A | * | 2/2000 | Lipo et al. | 363/37 |

\* cited by examiner

Primary Examiner—Thuy Vinh Tran
(74) Attorney, Agent, or Firm—Gary R. Stanford

(57) ABSTRACT

A multiplexed high voltage DC-AC driver including multiple DC-AC switches and decoder logic. Each DC-AC switch receives an input DC voltage and is operative, when enable, to toggle its output at a rate based on a master clock signal and at a voltage based on the input DC voltage. The DC-AC switches include one or more high side switches and a low side switch. The low side switch includes a clock inverter and operates out-of-phase relative to each high side switch. The decoder logic enables selected ones of the high side switches and enables the low side switch when any high side switch is enabled.

20 Claims, 1 Drawing Sheet

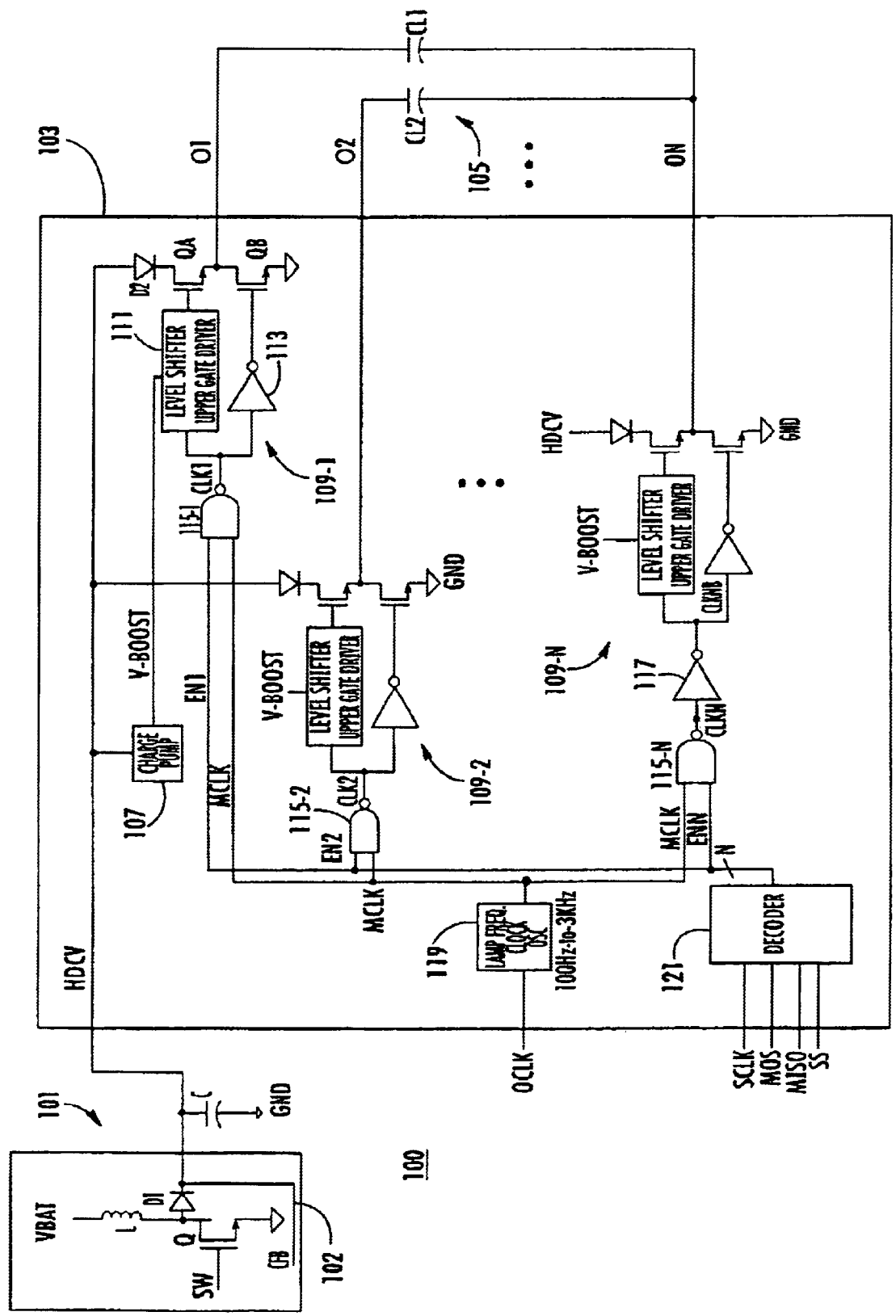

MULTIPLEXED HIGH VOLTAGE DC-AC DRIVER

BACKGROUND OF THE INVENTION

1. Field of the Invention

The present invention relates to high voltage drivers, and more particularly to converting a DC signal to high voltage AC signals and multiplexing the high voltage AC signals to multiple loads, such as electroluminescent lamps and the like.

2. Description of the Related Art

Electroluminescent lamps (EL) are essentially capacitors with one transparent electrode and a special phosphor material in the dielectric. When an appropriate AC voltage level is applied across the EL terminals, the phosphor glows. The brightness of a typical EL lamp is a function of the square of the voltage times the frequency, which is an approximation that holds over the useful range of most lamps. Common applications include back lights for digital displays, such as found on watches, pagers, cell phones, GPS devices, etc. Watches were a first application of EL lamps, which typically required about 80 to 100 Volts (V) peak-to-peak and a frequency of about 100 to 200 Hertz (Hz). Pagers required a slightly brighter display and higher voltage and frequency levels (e.g., 100 to 200 V and 300 Hz). Cell phones pushed the peak voltage to about 200 V. A more recent application of EL lamps include warning or indicator lamps for use in automobiles. Auto warning lamps require a light bright enough to be clearly seen in daylight, which has pushed the voltage upwards to a peak-to-peak voltage level of about 700 V.

The required AC voltage for automobile use has a relatively high magnitude on the order of several hundred volts (V) (e.g., 350 V). The required AC voltage, however, is not typically present in most systems and must be generated from a low voltage DC source, such as, for example, the 12 V battery. One proposed approach is to employ a crude boost switching converter and an H-bridge circuit to develop the requisite high AC voltage. The converter converts the low DC voltage to a high DC voltage, and the H-bridge circuit converts the high DC voltage into the high AC voltage consisting of two out-of-phase AC voltage signals. It would then be necessary to multiplex the two high voltage, out-of-phase AC signals to each pair of terminals of the lamps to be lighted. The multiplexing function would require 4-quadrant switches on both terminals of each lamp.

There are many problems with the proposed approach. It would generally require a 2-chip approach including a first driver chip designed to convert the relatively low DC voltage into the two out-of-phase AC voltage signals and a second chip to multiplex the AC voltages to selected ones of multiple lamps. Although driver chips for EL lamps exist, a driver capable of generating the very high voltage levels necessary to produce the high brightness required for automobile warning lights does not currently exist and would require substantial cost to design and manufacture. The second chip would also have to be designed and manufactured and would need to include 4-quadrant switches for each lamp. Each 4-quadrant switch would have to operate in a bidirectional manner to both source and sink current when activated and to block high voltage levels when turned off (up to approximately 350 V in both polarities). It is desired to provide a simpler and more cost-effective approach.

SUMMARY OF THE INVENTION

A multiplexed high voltage DC-AC driver according to an embodiment of the present invention includes multiple DC-AC switches and decoder logic. Each DC-AC switch receives an input DC voltage and is operative, when enabled, to toggle its output at a rate based on a master clock signal and at a voltage based on the input DC voltage. The DC-AC switches include one or more high side switches and a low side switch. The low side switch includes a clock inverter and operates out-of-phase relative to each high side switch. The decoder logic enables selected ones of the high side switches and enables the low side switch when any high side switch is enabled.

A boost switching converter driver may be included to convert a low voltage DC signal (e.g., from a battery or the like) into the higher-voltage input DC voltage. In one configuration, the DC-AC switches are implemented as half-bridge switches. The DC-AC switches may each include a driver circuit that alternates activation of first and second switches (e.g., FETs or the like) based on the master clock signal. In one embodiment, a level shifter driver and corresponding charge pump may be included to drive the high side switch of each DC-AC switch. In one embodiment, the decoder logic includes a decoder which provides enable signals to multiple gates, each receiving an enable signal and the master clock signal.

A multiplexed DC-AC converter according to an embodiment of the present invention includes a boost DC—DC converter and a DC-AC multiplexer. The boost DC—DC converter boosts a first DC voltage to a second DC voltage having a higher voltage level. The DC-AC multiplexer includes multiple DC-AC switches and select logic. Each DC-AC switch converts, when selected, the second DC voltage to a corresponding one of multiple AC output voltages. Each AC output voltage is switched between first and second DC voltage levels based on the second DC voltage at a rate based on a common clock signal. The DC-AC switches include at least one high side switch and a low side switch that operates out-of-phase relative to each high side switch. The select logic selects among the high side switches and selects the low side switch when any of the high side switches are selected. In a particular embodiment, the second DC voltage level is approximately 350 volts for driving a high voltage capacitive load, such as an electroluminescent lamp or the like.

A method of converting a DC voltage to a plurality of multiplexed AC voltages according to an embodiment of the present invention includes converting a low voltage DC signal to a high voltage DC signal, selecting from among a plurality of outputs, enabling a corresponding one of a plurality of first DC-AC converters for each selected output, switching, by each enabled first DC-AC converter, a corresponding one of the outputs between the high voltage DC signal and ground, enabling a second DC-AC converter when any of the first DC-AC converters are enabled, switching, by the second DC-AC converter when enabled, a common output between the high voltage DC signal and ground, and switching the second DC-AC converter out-of-phase relative to each first DC-AC converter.

BRIEF DESCRIPTION OF THE DRAWING(S)

The benefits, features, and advantages of the present invention will become better understood with regard to the following description, and accompanying drawing where:

The sole FIGURE is a schematic diagram of a multiplexed high voltage DC-AC driver implemented according to an exemplary embodiment of the present invention.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The sole FIGURE is a schematic diagram of a multiplexed high voltage DC-AC driver 100 implemented according to an exemplary embodiment of the present invention. The high voltage driver 100 includes a DC—DC driver 101, a DC-AC multiplexer 103, and multiple loads 105. As shown, there are N-1 capacitive loads 105 (e.g., each represented as a capacitor) individually labeled CL1, CL2, ... , CLN-1, where N is a positive integer and generally includes a sufficient number of outputs for a given application for driving a suitable number of loads. For example, a typical automotive application may include up to 15 EL lamps, where N is at least one greater than the total number of loads to provide a common return or "lows" output, as further described below. In the configuration shown, the N-1 loads CLI, CL2, ... , CLN-1 each have one terminal coupled to a respective one of N-1 output signals O1, O2, ... , ON-1, and a second terminal coupled to a common output signal ON of the DC-AC multiplexer 103. The capacitive loads 105 may be any type of capacitive devices, including electroluminescent lamps (EL) as known to those skilled in the art, although any type of high voltage AC load is contemplated. As previously described, EL lamps require a relative high voltage AC signal (e.g., 350 V) to enable illumination.

The DC—DC driver 101 is implemented as a relatively simple boost switching converter including an inductor L, a switch Q, an output diode D1 and a capacitor C. The inductor L has one terminal coupled to an input source DC voltage VBAT, and another terminal coupled to the anode of diode D1 and to the drain of the switch Q, which has its source coupled to ground. The cathode of diode D1 is coupled to one end of the capacitor C, having its other end coupled to ground. The switch Q is shown implemented as an N-channel metal-oxide semiconductor, field-effect transistor (MOSFET), although any alternative suitable switching device is contemplated. The VBAT voltage is provided from any suitable and/or local DC source device, such as a battery or the like. For automotive applications, VBAT is provided from the +12 V battery.

As known to those skilled in the art of DC switching regulators, a control circuit (not shown) provides a switching signal SW to the gate of the switch Q to draw current from VBAT through the inductor L and diode D1 to charge the capacitor C to develop a high DC voltage signal HDCV. The HDCV signal is fed back via a control feedback (CFB) path 102 to the control logic to regulate the HDCV signal to a desired voltage level. For application to EL lamps, the HDCV signal is regulated to several hundred Volts, such as approximately +350 V, although any suitable voltage level is contemplated. Certain portions of the DC—DC driver 101 may be conveniently implemented on a separate chip or found on an off-the-shelf device. The capacitor C is coupled off-chip via an output pin to ground to enable a user to select a suitable capacitive value. Alternatively, the DC—DC driver 101 is also easily and conveniently implemented using discrete devices as known to those skilled in the art.

Within the DC-AC multiplexer 103, the HDCV signal is provided to a charge pump 107 and to each of N DC-AC half-bridge switches 109-X, individually labeled 109-1, 109-2, ... , 109-N (where "X" varies from 1 to N), which generate the N output signals O1–ON. In the embodiment illustrated, the switches 109-X are half-bridge switches, although other types of DC-AC converters are contemplated. The first N-1 switches 109-1 to 109-(N-l) (the switch 109 N-1 not shown) are high side switches and the last switch 109-N is a low side switch. The charge pump 107 adds a drive voltage of about 7–8 volts to the voltage level of the HDCV signal to develop a voltage boost signal V-BOOST (e.g., having a voltage of approximately 357–358 V). Only the switch 109-1 is described in detail, where it is understood that each every other switch 109-X is configured to operate in substantially a similar manner. The HDCV signal is provided to the anode of a diode D2, having it cathode coupled to the drain of a first switch QA. The source of QA develops the output signal O1 and is coupled to the drain of a second switch QB, which has its source coupled to ground. The switches QA and QB are shown as N-channel MOSFETs, although alternative suitable switches are contemplated. A level shifter and upper gate driver 111 receives the V-BOOST signal and an input clock signal CLK1 and has an output driving the gate of switch QA. The CLK1 signal is provided to an inverter/driver 113, which has its output coupled to the gate of switch QB.

N two-input NAND gates 115-1, 115-2, ... , 115-N each have a first input receiving a master clock signal MCLK, a second input receiving a respective one of N enable signals ENl–ENN, and an output asserting a respective one of N clock signals CLK1–CLKN. The switches 109-X are configured in a substantially similar manner and are each controlled by a respective one of the clock signals CLK1–CLKN when enabled by the corresponding enable signal EN1–ENN. As illustrated by the switch 109-1, when the EN1 signal is high, the CLK1 signal toggles as an inverted version of the MCLK signal. The remaining high side switches 109-2 to 109-(N-1) are configured to operate in substantially identical manner for developing the respective output signals O2–ON-1 to the respective loads CL2–CLN-1. The last low side switch 109-N includes an additional inverter 117 which inverts the last clock signal CLKN to an inverted clock signal CLKNB (where a "B" appended to a signal name denotes logic negation unless otherwise specified). In this manner, the last switch 109-N operates 180 degrees out-of-phase relative to the remaining switches 109-X to develop the ON signal as a common output signal, which is coupled to the other terminal of the loads CL1–CLN-1.

An oscillator circuit 119 generates the MCLK signal provided to each of the NAND gates 115-X. The oscillator circuit 119 receives a signal (or is otherwise connected to an external connection or pin) labeled OCLK. In the configuration shown, a user either provides an external clock signal or otherwise programs the oscillator circuit 119 to a selected frequency level. In particular, the user provides the external clock signal via the OCLK signal, which is buffered and forwarded by the oscillator circuit 119 as the MCLK signal. Alternatively, the user couples a capacitor between the OCLK signal and ground to program the oscillator circuit 119 to operate at the desired frequency. In the configuration shown for driving EL lamps, the MCLK signal is a square-wave signal having a programmed frequency between 100 Hertz (Hz) and 3 kilohertz (KHz). Such clock circuits are known to those skilled in the art and will not be further described.

The enable signals EN1–ENN are generated by a Serial Peripheral Interface (SPI) decoder 121. The SPI decoder 121 is a slave device that is programmed by a corresponding SPI master device (not shown) via an SPI interface, which includes a clock signal SCLK, a slave select (SS) signal, and two data signals including a master data output, slave input (MOSI) signal and a master data input, slave output (MISO) signal as shown. The SPI interface is an industry standard known to those skilled in the art and is not further described. When programmed, the SPI decoder 121 asserts any of the EN1 to ENN-1 signals to select from among the output signals O1–ON-1 to activate selected ones of the loads CL1–CLN-1. The SPI decoder 121 also operates to assert the ENN signal high when any of the EN1–ENN-1 signals are asserted high to enable the common output signal ON.

In operation, the frequency of MCLK is programmed to the desired frequency as previously described and the SPI master controls the SPI decoder 121 to activate selected loads. Operation of the first switch 109-1 and the last switch 109-N are described to illustrate activation of the load CL1, where it is understood that the remaining switches 109-X operate in a similar manner as the switch 109-1. The SPI decoder 121 asserts the EN1 and ENN signals to activate the load CL1, so that the CLK1 signal becomes an inverted version of the MCLK signal. When the CLK1 signal is asserted high by the NAND gate 115-1, the level shifter and upper gate driver 111 activates the switch QA and the inverter/buffer 113 turns off the switch QB. The voltage of the HDCV signal is applied through the diode D2 and the switch QA to the load CL1 as the O1 output signal. Since the switch QA is operated at a high voltage level and since the CLK1 signal is a relatively low digital signal (e.g., 5V or the like), the level shifter and upper gate driver 111 applies the V-BOOST voltage to the gate of switch QA to turn it on. When the CLK1 signal is asserted low by the NAND gate 115-1, the level shifter and upper gate driver 111 turns off the switch QA and the inverter/driver 113 turns on the QB to effectively ground the O1 signal.

The last switch 109-N is enabled when the switch 109-1 (or any other switch) is enabled by the SPI decoder 121. The last switch 109-N operates in substantially the same manner as the switch 109-1 except that the inverter 117 causes the ON common output signal to operate 180 degrees out-of-phase relative to the O1 signal. In general, each of the switches 109-X toggle at the rate of the MCLK signal when enabled. The first N-1 switches 109-1 to 109-(N-1) toggle based on the clock signals CLK1–CLKN-1, respectively, which are 180 degrees out-of-phase relative to the MCLK signal because of operation of the NAND gates 115-X. The last switch 109-N toggles based on the CLKNB signal, which is generally in phase with the MCLK signal and thus out-of-phase with all of the other clock signals CLK1–CLKN-1.

In this manner, the O1 and ON signals are both a square-wave AC signals that alternate between approximately 350 V and 0 V at a rate determined by the MCLK signal, except out-of-phase relative to each other. Thus, the O1 signal is asserted high when the ON signal is low and vise-versa. In general, the ON signal operates out-of-phase relative to all of the other output signals O1–ON-1 because of the inverter 117. The effective peak-to-peak voltage of the AC signal provided to each load is 700 V. Thus, the load CLI receives the appropriate AC signal to turn it on. When the EN1 signal is asserted low to disable the DC-AC switch 109-1 and turn off the load CL1, the NAND gate 115-1 asserts its output high and the inverter/buffer 113 asserts its output low turning off the switch QB. In this case after a short period, the level shifter and upper gate driver 111 turns off the switch QA and the output O1 is tri-stated. In one embodiment, the level shifter and upper gate driver 111 is configured to sense that the CLK1 signal is not alternating and to assert its output low to turn off QA. Alternatively, the EN1 signal is provided to the level shifter and upper gate driver 111, which is configured to pull its output low to turn off QA when the EN1 signal is low. In any event, when any of the O1–ON outputs are not selected, they are tri-stated by turning off both switches QA and QB for each stage.

It is appreciated that the multiplexed high voltage DC-AC driver 100 implemented according to an exemplary embodiment of the present invention provides an efficient method of multiplexing multiple high voltage AC loads from a signal low voltage DC source. The complexity of the front-end DC converter 101 is significantly simplified and therefore smaller and substantially cheaper than a device or chip that is configured to convert the VBAT signal to a pair of AC signals. The DC converter 101 may be implemented with discrete logic or by an off-the-shelf component. The multiplexer 103 is simplified in that a single DC signal is converted to the AC signals instead of receiving and multiplexing a pair of AC signals. The selection logic is similar in both cases and only very simple and programmable clock logic is used to generated the MCLK signal to control switching of the outputs. The H-bridge driving and clocking circuitry, which would otherwise be necessary and which is significantly more complicated, is eliminated.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A multiplexed high voltage DC-AC driver, comprising:
a plurality of DC-AC switches, each receiving an input DC voltage, and each operative, when enabled, to toggle its output at a rate based on a master clock signal and at a voltage based on said input DC voltage;
said plurality of DC-AC switches including at least one high side switch and a low side switch;
said low side switch including a clock inverter and operating out-of-phase relative to each enabled high side switch; and
decoder logic that enables selected ones of said at least one high side switch and that enables said low side switch when any high side switch is enabled.

2. The multiplexed high voltage DC-AC driver of claim 1, further comprising a boost switching converter driver that converts a low voltage DC signal into said input DC voltage having a higher voltage level.

3. The multiplexed high voltage DC-AC driver of claim 1, wherein each of said plurality of DC-AC switches comprises a half-bridge switch.

4. The multiplexed high voltage DC-AC driver of claim 1, wherein each of said plurality of DC-AC switches comprises:
first and second switches having a current path coupled between said input DC voltage and ground, having an intermediate output node and having first and second control inputs; and
a driver circuit that alternates activation of said first and second switches based on said master clock signal.

5. The multiplexed high voltage DC-AC driver of claim 4, wherein:

said driver circuit comprises:
  a level shifter driver having an input receiving a corresponding one of a plurality of enable clock signals and an output coupled to said first control-input; and
  an inverter/driver having an input receiving said corresponding enable clock signal and an output coupled to said second control input; and
  wherein said decoder logic provides selected ones of said plurality of enable clock signals, which are based on said master clock signal.

6. The multiplexed high voltage DC-AC driver of claim 5, further comprising a charge pump having an input receiving said input DC voltage and an output that provides a boost voltage signal to said level shifter driver.

7. The multiplexed high voltage DC-AC driver of claim 4, wherein said first and second switches each comprise a field-effect transistor (FET).

8. The multiplexed high voltage DC-AC driver of claim 4, further comprising a diode coupled in series between said input DC voltage and said current path of said first and second switches.

9. The multiplexed high voltage DC-AC driver of claim 1, wherein said decoder logic comprises:
  a plurality of gates, each having a first input receiving said master clock signal, a second input receiving a corresponding one of a plurality of enable signals, and an output providing a corresponding one of a plurality of enable clock signals; and
  a decoder that provides said plurality of enable signals.

10. The multiplexed high voltage DC-AC driver of claim 9, wherein each of said plurality of gates comprises a NAND gate.

11. The multiplexed high voltage DC-AC driver of claim 9, wherein said decoder comprises a serial peripheral interface.

12. A multiplexed DC-AC converter, comprising:
  a boost DC—DC converter that boosts a first DC voltage to a second DC voltage having a higher voltage level; and
  a DC-AC multiplexer, coupled to said boost DC—DC converter, comprising:
    a plurality of DC-AC switches, each converting, when selected, said second DC voltage to a corresponding one of a plurality of AC output voltages in which each AC output voltage is switched between first and second DC voltage levels based on said second DC voltage at a rate based on a common clock signal;
    said plurality of DC-AC switches including at least one high side switch and a low side switch that operates out-of-phase relative to each high side switch; and
    select logic that selects among said at least one high side switch and that selects said low side switch when any high side switch is selected.

13. The multiplexed DC-AC converter of claim 12, wherein said second DC voltage level is approximately 350 volts.

14. The multiplexed DC-AC converter of claim 12, wherein each AC output voltage is switched, when selected between approximately zero volts and approximately 350 volts.

15. The multiplexed DC-AC converter of claim 12, further comprising a load coupled between an AC output voltage of a high side switch and an AC output voltage of said low side switch.

16. The multiplexed DC-AC converter of claim 15, wherein said load comprises an electroluminescent lamp.

17. The multiplexed DC-AC converter of claim 12, wherein each of said plurality of DC-AC switches comprises:
  a first switch having a current path coupled between said second DC voltage and a corresponding AC output voltage and having a first control input;
  a second switch having a current path coupled between said corresponding AC output voltage and ground and having a second control input;
  a level shifter driver having an input receiving a corresponding one of a plurality of enable clock signals and an output coupled to said first control input; and
  an inverter/driver having an input receiving said corresponding enable clock signal and an output coupled to said second control input;
  wherein said low side switch further includes a clock inverter that inverts a corresponding one of said plurality of enable clock signals.

18. The multiplexed DC-AC converter of claim 17, wherein said select logic comprises:
  enable logic that provides a corresponding one of said plurality of enable clock signals based on said common clock signal when a corresponding one of a plurality of enable signals is provided; and
  a decoder that provides said plurality of enable signals to select among said high side switches and to select said low side switch when any of said high side switches are selected.

19. A method of converting a DC voltage to a plurality of multiplexed AC voltages, comprising:
  converting a low voltage DC signal to a high voltage DC signal;
  coupling the high voltage DC signal to a plurality of DC-AC converters providing a plurality of outputs;
  selecting from among the plurality of outputs;
  enabling a corresponding one of a plurality of first DC-AC converters for each selected output;
  switching, by each enabled first DC-AC converter, a corresponding one of the plurality of outputs between the high voltage DC signal and ground;
  enabling a second DC-AC converter when any of the first DC-AC converters are enabled;
  switching, by the second DC-AC converter when enabled, a common output between the high voltage DC signal and ground; and
  switching the second DC-AC converter out-of-phase relative to each first DC-AC converter.

20. The method of claim 19, wherein said switching a corresponding one of said plurality of outputs and said switching a common output each comprises:
  alternating activating between first and second switches;
  the first switch, when activated, coupling a corresponding output to the high voltage DC signal; and
  the second switch, when activated, coupling the corresponding output to ground.

* * * * *